United States Patent [19]

Borsotti

[11] Patent Number: 4,784,803

[45] Date of Patent: Nov. 15, 1988

[54] CHEMILUMINESCENT COMPOSITION, AND A REACTIVE COMPONENT SUITABLE FOR SUCH A COMPOSITION

[75] Inventor: Giampiero Borsotti, Novara, Italy

[73] Assignee: Farmitalia Carlo Erba S.p.A., Milan, Italy

[21] Appl. No.: 64,708

[22] Filed: Jun. 22, 1987

[30] Foreign Application Priority Data

Jun. 30, 1986 [IT] Italy .................. 20971 A/86

[51] Int. Cl.$^4$ .................. C09K 11/00; C07C 69/36
[52] U.S. Cl. .................. 252/700; 560/193
[58] Field of Search .................. 252/700; 560/193

[56] References Cited

U.S. PATENT DOCUMENTS

| | | | |
|---|---|---|---|
| 3,539,794 | 11/1970 | Rauhut | 252/700 |
| 3,781,329 | 12/1973 | Bollyky | 252/700 |
| 3,816,326 | 6/1974 | Bollyky | 252/700 |
| 3,994,820 | 11/1976 | Maulding | 252/700 |
| 4,053,430 | 10/1977 | Mohan | 252/700 |
| 4,076,645 | 2/1978 | Vega | 252/700 |
| 4,508,642 | 4/1985 | World | 252/700 |
| 4,682,544 | 7/1987 | Koroscil | 252/700 |
| 4,698,183 | 10/1987 | Koroscil | 252/700 |

OTHER PUBLICATIONS

McCapra, "Photochemistry Without Light", Tetrahedron Letters, vol. 22, No. 50, pp. 5087–5090, 1981.

*Primary Examiner*—Matthew A. Thexton
*Assistant Examiner*—Catherine S. Kilby
*Attorney, Agent, or Firm*—Oblon, Fisher, Spivak, McClelland & Maier

[57] ABSTRACT

The invention relates to a chemiluminescent composition, i.e. one which emits light when its various constituent components are mixed together.

The composition consists of at least two separate solutions of at least one oxalate, at least one fluorescent substance, hydrogen peroxide and at least one catalyst, in which those components which react together are kept separated. The characteristic of the 9,10-bis(-phenylethynyl)anthracene is that the oxalate is a bis(-dihalo-acylphenyl)oxalate. This compound is easily and economically produced and is easily soluble in the solvents used, to provide high-intensity light emission for long time periods. The 2,4- or 2,6-acyl substituted phenyloxalate also forms a subject matter of the invention.

9 Claims, No Drawings

CHEMILUMINESCENT COMPOSITION, AND A REACTIVE COMPONENT SUITABLE FOR SUCH A COMPOSITION

This invention relates to a chemiluminescent composition, i.e. a composition comprising several components which react together to emit light for a sufficiently long time.

Chemiluminescent compositions are already known, and are contained in devices used as a light source in cases of emergency.

The known compositions of greatest efficiency comprise a reactive component in the form of an aryl oxalate which, when reacted with $H_2O_2$ in the presence of a fluorescent substance, produces a light emission (Kirk-Othmer, vol. 5, page 425 onwards). The practical use of these compounds is however greatly limited by the considerable loss of quantum yield when the oxalate concentration is increased, and by their poor solubility in solvents suitable for the purpose (the more common solvents such as DMF, DMSO, ethyl ether, xylene etc. cannot be used because the reaction does not take place in them).

Numerous patents exist covering various chemiluminescent compositions.

U.S. Pat. No. 3,597,362 cites a whole series of aryl oxalates, including bis(4-acetylphenyl)oxalate. This latter compound, and all the other aryl oxalates mentioned in the U.S.A. patent, are poorly soluble in solvents. In this respect, the data given in the patent show that the maximum possible concentration is 0.01 moles/liter for 2,4-dinitrophenyl oxalate, with a maximum obtainable light intensity of 3.05 ft-Lambert/cm, the time required for the light intensity to reduce to ¼ of its maximum value being only 4 minutes. These serious limitations are confirmed by the proprietor of this patent himself in lines 23–27 and lines 53–55 of column 2 of his subsequent U.S. Pat. No. 3,749,679.

U.S. Pat. No. 3,749,679 states that the introduction of a carbalkoxy group on the aryl group of the aryl oxalate enables excellent solubility in solvents to be obtained, together with high quantum yields even at high oxalate concentrations.

To emphasise the superiority of the carboxy group, this U.S.A. patent cites other examples of oxalates (see the tables) with sigma values of between 1.4 and 2.7 but without the carboxy group, these therefore giving substantially lower light capacities.

The preparation of the carboxy aryl oxalates covered by this U.S.A. patent is however rather complicated, and takes place in accordance with the following scheme

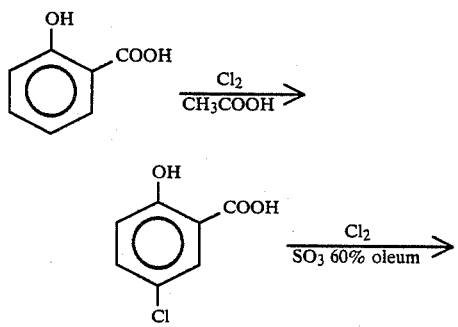

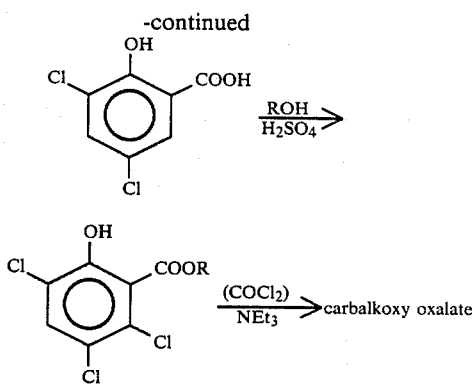

It will be noted that $SO_3$ and $Cl_2$ must be used in this reaction scheme.

U.S. Pat. No. 4,017,416 relates to the use of alumina for treating ester solutions, in order to give initial high luminosity. South African patent No. 732681 teaches that the addition of small quantities of polymers to compositions such as the aforesaid improves quantum yield.

The main object of the present invention is to provide a chemiluminescent composition which has a high light emission yield, requires a considerable time for the emitted light intensity to reduce to ¼ of its maximum value, and is extremely simple and economical to synthesize.

The chemiluminescent composition according to the present invention comprises at least two solutions of at least one oxalate, at least one fluorescent substance, hydrogen peroxide, and at least one catalyst chosen from the group consisting of alkaline salts of long-chain carboxylic acids and sodium and potassium salicylates, said oxalate being present in one of said solutions and the hydrogen peroxide being present in the other solution, the composition being characterised in that said oxalate is a bis(dihalo-acylphenyl)oxalate.

Preferably, the bis(dihalo-acylphenyl)oxalate is chosen from the group consisting of bis(2,6-dichloro-4-hexanoylphenyl) oxalate and bis(2,6-dibromo-4-hexanoylphenyl)oxalate.

The preferred fluroescent substances are chosen from the group consisting of 9,10-bis(phenylethynyl)anthracene, 9,10-diphenyl anthracene and perylene derivatives such as isobutyl 3,9-perylenedicarboxylate.

Preferred catalysts are those included in the group consisting of potassium or sodium salicylate, potassium or sodium stearate and potassium or sodium ethylhexanoate.

The concentrations of the various chemiluminescent composition components in the respective solvent are between 0.01 and 0.3 moles/liter, and preferably between 0.05 and 0.15 moles/liter for the oxalate; between 0.05% and 0.15%, and preferably between 0.07% and 0.12% for the fluorescent substance; between 0.001% and 0.00001% for the catalyst; and between 3% and 20%, and preferably between 5% and 10% for the hydrogen peroxide; while maintaining a ratio of 2–10 moles, and preferably 5–8 moles, of hydrogen peroxide per mole of oxalate.

The aforesaid components are dissolved in a suitable solvent, those components able to react together being kept separated. If desired it is also possible to prepare separate solutions of each of the various components, then mixing these solutions together at the moment of reaction. In practice, it is preferred to mix compatible substances together. Preferably, the oxalate and fluorescent substance are dissolved in a first solvent, and a second solution is prepared with the hydrogen peroxide and catalyst in a second solvent, which can be the same as or different from the first.

The two separate solutions can be preserved for a long period without appreciable loss of activity. When, in any manner, the two solutions are mixed together, light emission occurs. Suitable solvents (either alone or mixed together in any proportions) for the oxalate and fluoroescent substance are esters, chlorinated hydrocarbons and methyl tert-butylether. The preferred solvents are methyl, butyl, ethylhexyl and similar phthalates, butyl and ethylhexyl acetates, and methyl tert-butylether. It is important to note that methyl tert-butylether is unique of its kind. With other ethers, such as ethyl ether, diphenyl ether, dimethoxybenzene etc., the reaction does not take place.

Suitable solvents (either alone or in mixture) for the hydrogen peroxide and catalyst are methyl or ethyl phthalates, methyl tert-butylether, and tertiary alcohols such as tert-butyl alcohol, tert-amyl alcohol and the like.

It should be noted that the use of hydrogen peroxide of less than 98% concentration (the minimum concentration limit of previous patents) is not prejudicial, to the extent that the use of 85% hydrogen peroxide results only in a slight difference after several hours of light emission, and in any event at light intensities which are no longer useful.

It should also be noted that on increasing the catalyst quantity there is an increase in emitted light intensity, with proportionally lower duration times, so that it is possible to choose the catalyst concentration on the basis of the results to be obtained.

In short, the essence of the invention consists of having discovered that the chemiluminescent composition possesses elevated characteristics when a particular oxalate is used, namely a dihalo-substituted acylphenyl oxalate, which also forms a subject matter of the present invention as a new compound for use in such compositions.

In particular, it has been found that the dihalo-substituted acylphenyl oxalates according to the present invention, and possessing a long-chain ketone group, unexpectedly have good solubility in the solvents commonly used in such applications, and surprisingly also enable light intensity values and time periods for the light intensity to reduce to ¼ of its maximum value to be obtained, which are 15 to 20 times greater than the corresponding values obtainable when using for example the bis(4-acetylphenyl)oxalate described in the literature.

It is also of great importance to note that the bis(-dihaloacylphenyl)oxalates can be prepared by an extremely simple and economical process (in only two steps) without using dangerous compounds, in accordance with the reaction scheme

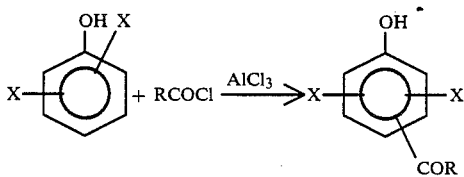

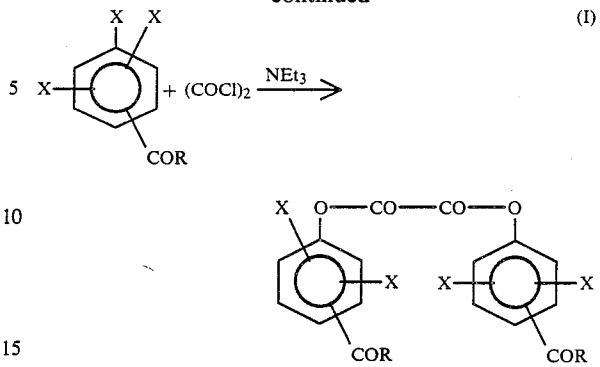

in which:

R is an alkyl containing from 3 to 11 carbon atoms,

X is a halogen chosen from the group consisting of F, Cl, Br in meta-meta positions with respect to the acyl group, whereas the RCO— group can be in the ortho or para position with respect to the phenolic hydroxyl.

The starting compounds for the reaction of this latter scheme are economical and are easily obtainable commercially.

By way of non-limiting illustration, Examples 1 to 5 given hereinafter describe the preparation of some bis(-dihalo-acyl-phenyl)oxalates according to the present invention, the subsequent examples illustrating some chemiluminescent compositions using the oxalates of the preceding examples.

EXAMPLE 1

Preparation of 2,6-dichloro-4-octanoyl phenol and then of bis(2,6-dichloro-4-octanoylphenyl)oxalate 32.6 g of 2,6-dichlorophenol and 0.5 g of $AlCl_3$ are fed into a 250 cc flask, the mixture is heated to 80° C., and 34 g of octanoyl chloride are dripped in in such a manner as to obtain controlled evolvement of HCl (approximately 40 minutes). 30 g of $AlCl_3$ are then added in 4–5 g portions over 15 minutes.

There is an initial temperature rise to 100°–110° C.

The reaction mass is heated to 130° C. for 3 hours, and is then poured into 300 cc of water and ice, and extracted with ethyl ether.

The extract is washed with water and then with a $NaHCO_3$ solution, dried, filtered through a layer of silica gel and evaporated to dryness. The solid residue can be purified by crystallisation or by distillation, or can be used as such in the next step.

For example, by crystallisation from 300 cc of petroleum ether, 44.6 g of pure product are obtained with a M.P. of 53°–54° C. and a yield of 77.1%.

A solution of 6.45 cc of oxalyl chloride in 30 cc of toluene are dripped over one hour into a solution of 43.4 g of 2,6-dichloro-4-octanoyl phenol and 21 cc of triethylamine in 300 cc of toluene cooled to 10° C. The suspension is agitated for a further one hour at ambient temperature, and the triethylamine hydrochloride is then filtered off.

The toluene solution is evaporated under vacuum to obtain a crystalline residue of 47.5 g. This is crystallised from 250 cc of heptane twice, the solution being decolorised with carbon and filtered through a layer of silica gel. 34.5 g of white crystalline oxalate of M.P. 104°–104.5° C. are obtained, with a yield of 72.7%.

EXAMPLE 2

Preparation of 2,6-dichloro-4-hexanoyl phenol and then of bis(2,6-dichloro-4-hexanoylphenyl)oxalate The procedure of Example 1 is repeated, but using 30 g of hexanoyl chloride instead of octanoyl chloride.

After crystallising the crude reaction product from petroleum ether, 38 g of pure product are obtained of M.P. 732°–74° C. with a yield of 72.8%.

A solution of 4.3 cc (0.05 moles) of oxalyl chloride in 20 cc of toluene is dripped over one hour into a solution of 26.1 g (0.1 moles) of 2,6-dichloro-4-hexanoyl phenol and 14 cc (0.2 moles) of triethylamine in 150 cc of toluene cooled to 10° C. After a further hour of agitation at ambient temperature, the suspension is filtered and the solution is evaporated to dryness under vacuum. The crystalline residue is crystallised from heptane twice, operating as in Example 1, to obtain 15.0 g of white crystalline oxalate of M.P. 97.5°–98.5° C. with a yield of 52%.

EXAMPLE 3

Preparation of 2,6-dibromo-4-hexanoyl phenol and then of bis(2,6-dibromo-4-hexanoylphenyl)oxalate 9.6 g (0.05 moles) of 4-hexanoyl phenol (prepared in a manner similar to the other already described derivatives from phenol, hexanoyl chloride and $AlCl_3$ and separated from the ortho isomer by fractional distillation) are dissolved in 150 cc of glacial $CH_3COOH$. 30 g of anhydrous $CH_3COOK$ are added, and 16 g of bromine are dripped in maintaining the temperature at about 20° C. The reaction mass is agitated for 2 hours, is then diluted with 500 cc of water and extracted with ethyl ether.

The ether extract is washed with $NaHCO_3$ solution, is then dried and evaporated to dryness. The solid residue is crystallised from petroleum ether to obtain 14 g of pure product of M.P. 68°–69° C. with a yield of 80%.

Operating in a like manner to Example 2 and starting from 35 g (0.1 moles) of 2,6-dibromo-4-hexanoyl phenol, 20.0 g of oxalate of M.P. 102°–103° C. are obtained after crystallization from heptane, with a yield of 53.0%.

EXAMPLE 4

Preparation of 2,4-dichloro-6-hexanoyl phenol and then of bis(2,4-dichloro-6-hexanoylphenyl)oxalate A solution of 65 g of 2,4-dichlorophenol and 60 g of hexanoyl chloride is heated to 100°–110° C. for 2 hours until HCL evolvement ceases. 60 g of $AlCl_3$ are added over 15 minutes. The temperature rises to 120°–125° C. The temperature is raised to 140°–150° C. and kept at this level for 3 hours.

On termination, the reaction mass is poured into 300 cc of water and ice, and the organic product extracted with hexane. The extract is washed with $H_2O$ and then with a saturated $NaHCO_3$ solution, dried over $Na_2SO_4$ and evaporated under vacuum. 105 g of crude product are obtained which can be either used directly in the next step or purified by distillation or crystallisation.

For example, by vacuum distillation a central fraction of pure product is obtained having a boiling point of 140°–145° C./1 mmHg weighing 75 g, with a yield of 72% with respect to the 2,4-dichlorophenol.

14 cc (0.1 moles) of triethylamine are added to a solution of 26.1 g (0.1 moles) of 2,4-dichloro-6-hexanoyl phenol distillate obtained as stated heretofore in 100 cc of ethyl ether, the mixture is cooled to 10° C., and 4.3 cc of oxalyl chloride in 20 cc of ethyl ether are dripped in over one hour. On termination, the mixture is agitated for one hour at ambient temperature, the precipitate consisting of triethylamine hydrochloride is filtered off, and the solution evaporated to dryness. The solid residue is crystallised from hexane, decolorising the solution with carbon and filtering it twice through a 2–3 cm layer of silica gel. 19.6 g of white crystalline oxalate are obtained of M.P. 98°–99° C., with a yield of 68%.

EXAMPLE 5

Preparation of 2,4-dichloro-6-octanoyl phenol and then of bis(2,4-dichloro-6-octanoylphenyl)oxalate The procedure of Example 4 is followed, but using 70 g of octanoyl chloride instead of hexanoyl chloride. After purification by distillation, 78 g of 2,4-dichloro-6-octanoylphenol are obtained having a boiling point of 170°–175° C./0.8 mmHg, with a yield of 67.7%.

Further operating as in Example 4 and starting from 28.9 g (0.1 moles) of 2,4-dichloro-6-octanoylphenol, 20.5 g of bis(2,4-dichloro-6-octanoylphenyl)oxalate of M.P. 80°–81° C. are obtained with a yield of 64.8%.

EXAMPLE 6

A first solution is prepared consisting of 0.45 g (5.65%) of bis(2,6-dichloro-4-hexanoylphenyl)oxalate, 7 g (87.96%) of butyl phthalate, 0.5 g (6.28%) of methyl tert-butylether, and 8 mg (0.1%) of 9,10-bis(phenylethynyl)anthracene; and a second solution is prepared consisting of 1.818 g (72.74%) of dimethylphthalate, 0.485 g (19.39%) of tert-butanol, 0.196 g (7.856%) of 85% $H_2O_2$ and 0.3 mg (0.00012%) of potassium salicylate.

The two solutions can be stored for a considerable time without their properties changing. When the two solutions are mixed together, yellow-green light of medium intensity is emitted, with a useful duration of 15–16 hours.

EXAMPLE 7

The two solutions described in Example 6 are prepared, but with the quantity of potassium salicylate being increased to 0.6 mg in the second solution.

When the two solutions are mixed together, light of medium-high intensity is emitted with a useful duration of 6–7 hours.

EXAMPLE 8

The procedure of Example 7 is repeated, but with the quantity of potassium salicylate being increased to 1.2 mg.

When the two solutions are mixed together, high intensity light is emitted with a duration of 2–3 hours.

EXAMPLE 9

A first solution consisting of 0.5 g of bis(2,6-dichloro-6-octanoylphenyl)oxalate, 7.5 g of butyl acetate and 8 mg of 9,10-bis(phenylethynyl)anthracene is prepared, and this solution is mixed with a second solution as specified in Example 6, to obtain light emission as defined in Example 6.

EXAMPLE 10

A first solution consisting of 0.6 g of bis(2,6-dibromo-4-hexanoylphenyl)oxalate, 7 g of butyl phthalate, 0.5 g of methyl tert-butylether and 8 mg of 9,10-bis(phenylethynyl)anthracene is prepared, and is mixed with a second solution as specified in Example 6, to obtain light emission with the characteristics stated in Example 6.

EXAMPLE 11

A first solution is prepared consisting of 0.45 g of bis(2,4-dichloro-6-hexanoylphenyl)oxalate, 6.5 g of butyl phthalate, 1 g of methyl tert-butylether and 8 ml of 9,10-bis(phenylethynyl)anthracene; and a second solution is prepared consisting of 1.818 g of methyl phthalate, 0.485 g of tert-butanol, 0.196 g of 85% $H_2O_2$ and 1.2 mg of potassium salicylate.

The two solutions are mixed together to obtain greenish light emission of low intensity, with a useful duration of 25–26 hours.

EXAMPLE 12

A first solution is prepared consisting of 0.5 g of bis(2,4-dichloro-6-octanoylphenyl)oxalate, 7 g of butyl phthalate and 8 mg of 9,10-bis(phenylethynyl)anthracene, and is mixed with a second solution as specified in Example 11 to obtain a light emission as specified in Example 11.

EXAMPLE 13

A first solution is prepared consisting of 0.45 g of bis(2,6-dichloro-6-hexanoylphenyl)oxalate, 7.5 g of butyl phthalate and 10 mg of a perylene dye in the form of isobutyl 3,9-perylene-dicarboxylate, this first solution being mixed with a second solution as specified in Example 11 to obtain green light emission of high intensity with a useful duration of 2–3 hours.

I claim:

1. A chemiluminescent composition formed from at least two separate solutions in which those components which react with each other are kept separated, the components being chosen from the group consisting of at least one oxalate, at least one fluorescent substance, hydrogen peroxide and at least one catalyst chosen from the group consisting of alkaline salts of long-chain carboxylic acids and sodium and potassium salicylates, characterized in that said oxalate is a bis(dihalo-acyl-phenyl) oxalate of the formula:

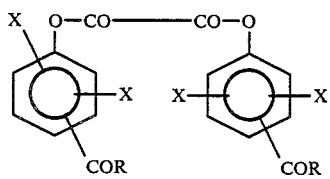
(I)

in which:

R is an alkyl containing from 3 to 11 carbon atoms,

X is a halogen chosen from the group consisting of F, Cl or Br in meta-meta positions with respect to the acyl group, and the —COR group is in the ortho or para position with respect to the phenolic hydroxyl, the hydrogen peroxide being present in the proportion of between 2 and 10 moles per mol of oxalate.

2. A chemiluminescent composition as claimed in claim 1, characterised in that said bis(dihalo-acyl-phenyl)oxalate is chosen from the group consisting of bis(2,6-dichloro-4-hexanoylphenyl)oxalate and bis(2,6-dibromo-4-hexanoylphenyl)oxalate.

3. A chemiluminescent composition as claimed in claims 1 and 2, characterised in that said fluorescent substance is chosen from the group consisting of 9,10-bis(phenylethynyl)anthracene, 9,10-diphenylanthracene and isobutyl 3,9-perylenedicarboxylate.

4. A chemiluminescent composition as claimed in claim 3, characterised in that said catalyst is chosen from the group consisting of sodium or potassium salicylate, sodium or potassium stearate, and sodium or potassium ethylhexanoate.

5. A chemiluminescent composition as claimed in claims 1 and 2, characterised in that said components are dissolved in the respective solvents in quantities of between 0.01 and 0.3 moles/liter in the case of the oxalate, between 0.05% and 0.15% in the case of the fluoroescent substance, between 0.001% and 0.00001% in the case of the catalyst, and between 3% and 20% in the case of the hydrogen peroxide.

6. A chemiluminescent composition as claimed in claim 5, characterised in that said components are dissolved in the respective solvents in quantities of between 0.05 and 0.15 moles/liter in the case of the oxalate, between 0.07% and 0.12% in the case of the fluorescent substance, and between 5% and 10% in the case of the hydrogen peroxide, the hydrogen peroxide being present in the proportion of between 5 and 8 moles per mole of oxalate.

7. A chemiluminescent composition as claimed in claims 1 and 2, characterised in that a first solution contains said oxalate and the fluorescent substance, and a second solution contains said catalyst and the hydrogen peroxide.

8. A chemiluminescent composition as claimed in claim 7, characterised in that the solvent for said first solution is chosen from the group consisting of methyl tert-butylether, methyl, butyl, ethylhexyl and similar phthalates, and butyl and ethylhexyl acetates, the solvent for said second solution being chosen from the group consisting of methyl tert-butylether and tertiary alcohols.

9. A chemiluminescent composition comprising, as an active ingredient, a bis(dihaloacylphenyl)oxalate of the formula:

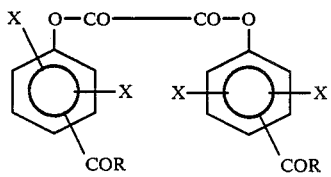
(I)

in which:

R is an alkyl containing from 3 to 11 carbon atoms,

X is a halogen chosen from the group consisting of F, Cl or Br in meta-meta positions with respect to the acyl group, and the —COR group is in the ortho or para position with respect to the phenolic hydroxyl.

* * * * *